United States Patent [19]
Oberthur

[11] 3,949,456
[45] Apr. 13, 1976

[54] BRAKE FORCE DISTRIBUTOR VALVE

[75] Inventor: Heinrich Oberthur, Offenbach-Rumpenheim, Germany

[73] Assignee: ITT Industries, Inc., New York, N.Y.

[22] Filed: Sept. 9, 1974

[21] Appl. No.: 504,627

Related U.S. Application Data

[63] Continuation-in-part of Ser. No. 299,481, Oct. 20, 1972, abandoned, which is a continuation-in-part of Ser. No. 71,166, Sept. 10, 1970, abandoned.

[30] Foreign Application Priority Data
Sept. 16, 1969 Germany............................ 1946773

[52] U.S. Cl................ 29/157.1 R; 29/446; 29/508;
29/516; 285/382; 303/6 C
[51] Int. Cl.²................... B21D 53/00; B23P 11/00
[58] Field of Search....... 29/157.1 R, 446, 453, 508,
29/516, 518; 303/6 C; 285/382; 138/89;
267/60, 179; 222/546, 554, 563; 220/310, 308

[56] References Cited
UNITED STATES PATENTS

| 599,492 | 2/1898 | Carter.................................. 29/517 |
| 2,141,184 | 12/1938 | Hothersall........................... 220/308 |
| 2,199,528 | 5/1940 | Sebell.................................. 220/308 |
| 2,210,158 | 8/1940 | Avakian............................... 29/516 |
| 2,462,291 | 2/1949 | Sette .............................. 29/157.1 R |
| 2,797,704 | 7/1957 | McDermott et al. ........... 29/157.1 R |
| 2,957,734 | 10/1960 | McLeod............................... 29/516 |
| 2,991,797 | 7/1961 | Baldwin .............................. 303/6 C |
| 3,183,040 | 5/1965 | Gold .................................... 303/6 C |
| 3,326,006 | 6/1967 | Mount .................................. 29/453 |
| 3,333,728 | 8/1967 | Burdick, Jr. ......................... 220/308 |
| 3,430,647 | 3/1969 | Suchowolec ................... 29/157.1 R |
| 3,466,086 | 9/1969 | James et al. ........................... 267/60 |

FOREIGN PATENTS OR APPLICATIONS

| 99,140 | 9/1961 | Netherlands.......................... 267/60 |
| 557,960 | 6/1957 | Belgium ............................... 267/60 |
| 977,796 | 12/1964 | United Kingdom................ 285/382 |

*Primary Examiner*—C. W. Lanham
*Assistant Examiner*—Dan C. Crane
*Attorney, Agent, or Firm*—John T. O'Halloran; Menotti J. Lombardi, Jr.; Alfred C. Hill

[57] ABSTRACT

A brake force distributor valve for limiting the brake pressure at the rear wheels of a vehicle when the load shifts to the front wheels during braking. The distributor valve includes a movable element which overcomes a spring to interrupt the flow to the rear wheel cylinders when the brake pressure exceeds a value determined by the preload on the spring. The spring abutment is fixed to the housing by shearing the surface of the material of one of the housing and abutment completely through at selected spaced locations about the periphery thereof and forcing the sheared material into a peripheral groove contained in the other of the housing and abutment while a predetermined force is applied to the spring to establish the spring preload and, hence, the response point of the valve.

3 Claims, 2 Drawing Figures

U.S. Patent  April 13, 1976  3,949,456
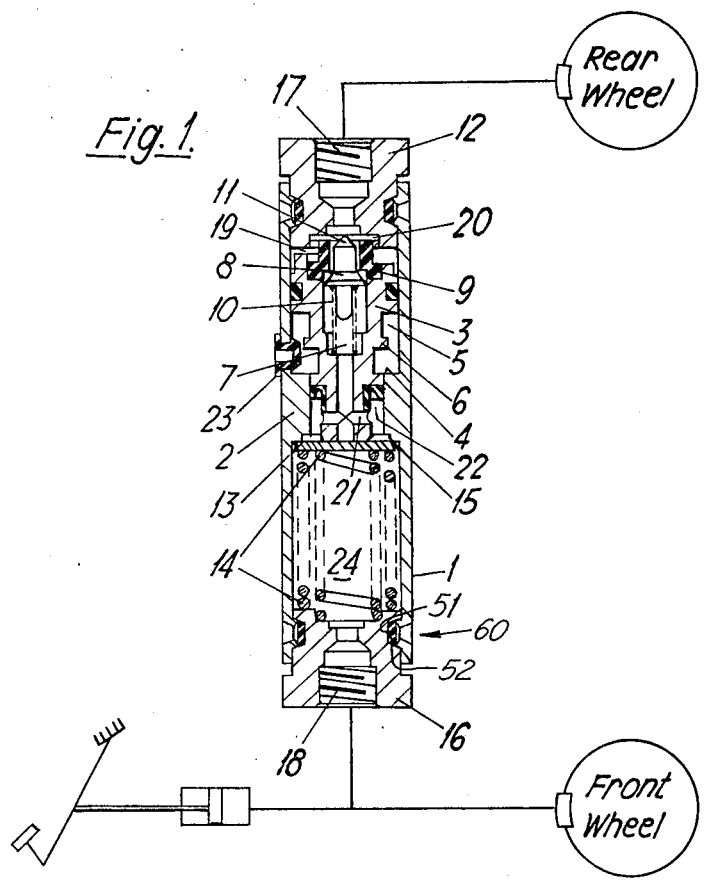
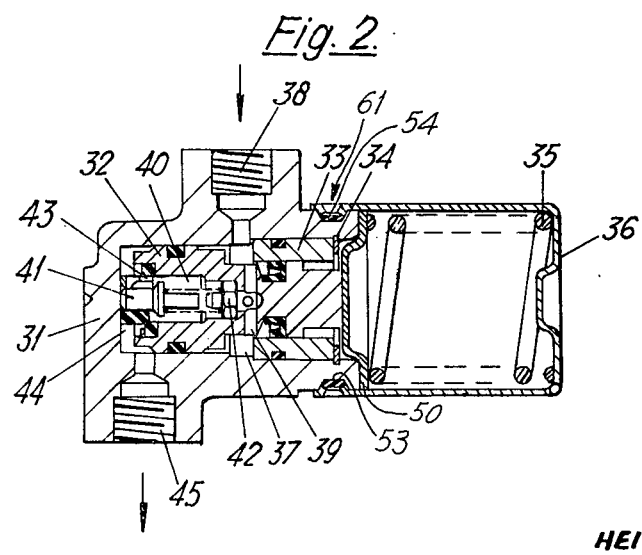
Inventor
HEINRICH OBERTHUR

BRAKE FORCE DISTRIBUTOR VALVE

CROSS-REFERENCE TO RELATED APPLICATIONS

This application is a continuation-in-part application of copending application Ser. No. 299,481, filed Oct. 20, 1972, now abandoned, which in turn is a continuation-in-part application of application Ser. No. 71,166, filed Sept. 10, 1970 (now abandoned).

BACKGROUND OF THE INVENTION

The invention relates to a brake force distributor, particularly for road vehicles, for connection with the hydraulic brake line leading from the master cylinder to the wheel brake cylinders, said brake force distributor being used to obtain a brake pressure control corresponding with the dynamic shift of the axle load.

Due to the shift of the axle load during the braking operation, the wheels of the rear axle of a vehicle tend to be overbraked and lock with increasing deceleration. This can be prevented by a brake force distributor which throttles or cuts off the flow of hydraulic brake fluid to the wheel brake cylinders of the rear axle when the load on that axle is reduced due to deceleration.

In the German periodical "AUTOMOBILTECHNISCHE ZEITSCHRIFT" No. 8/1964 an axle-load dependent controlled brake force distributor is described consisting of a hydraulic part and a mechanical part. The housing pertaining to the hydraulic part — the latter acting as a pressure-reducing valve — receives a double-stepped piston having a cone valve along its longitudinal axis which is open in rest position. The mechanical part consists of a prestressed spring which determines the point of response of the pressure-reducing valve, the spring seating at one end against the piston of the pressure-reducing valve while the other end seats against a mechanism for changing the preload on the spring.

The relatively large overall length of this brake force distributor is disadvantageous. In addition, the manufacturing and spring tolerances require that an adjusting screw be provided for the adjustment of the brake force distributor after the hydraulic portion has been screwed together with the mechanical portion. This of course is a disadvantage with regards to the manufacturing and assembly costs.

It is known in the art that the housing of the hydraulic part and the mechanical part could be connected together by crimping techniques. However, employment of such a technique results in material flow and, thus, a change in length of the members being connected together. Therefore, if the control spring had applied thereto a force sufficient to achieve the proper prestress for determining the point of response of the pressure-reducing valve prior to crimping, this prestress would be altered by the crimping technique due to the material flow. Thus, it would still be necessary to provide an adjusting screw for the control spring to achieve the proper prestress after the crimped connection is made.

SUMMARY OF THE INVENTION

An object of the present invention is to provide a brake force distributor which requires no adjustment after assembly.

A further object of the present invention is to provide a brake force distributor which is small and inexpensive to manufacture and assemble.

In assembling a brake force distributor valve including a housing and a prestressed spring having a predetermined force disposed within and coaxial of the housing acting between an abutment member fixed with respect to said housing and an axially movable valve body disposed within and coaxial of the housing, the predetermined force of the spring determining the point of response of the valve body, the method of connecting the housing to the abutment member comprising the steps of: forming a peripheral groove in one of the housing and the abutment member; assembling the housing and the abutment member in a telescoping manner with the spring disposed between the abutment member and the valve body, the one of the housing and the abutment member being disposed within the other of the housing and abutment member; applying a given axial force to the abutment member relative the housing to provide the spring with the predetermined force; shearing the surface of the material of the other of the housing and abutment member completely through at selected spaced locations about the periphery thereof corresponding to the peripheral groove before the given axial force is released; and forcing the sheared material into the peripheral groove just prior to release of the given axial force to connect the housing to the abutment member and to provide an exact location of the abutment member relative to the housing to maintain the predetermined force of the spring after the connection is made and the given axial force is released.

According to this invention the above method may further include the step of placing a sealing ring of rubber-like material in the peripheral groove; and wherein the above-mentioned step of forcing further includes the step of forcing the sheared material into the peripheral groove against the sealing ring to provide a high pressure seal between the housing and the abutment member.

In a preferred embodiment of the invention the annular chamber disposed between the tube and the valve housing is narrowed upon actuation of the system and provides a lateral bore into which a rubber plug of about double-T-(I) section is inserted, the central portion of said plug closing the bore and providing a very small opening pierced with a needle. The central portion of the plug in double-T-section closes the bore and provides a blind bore such that the wall of the plug is very thin within the area of the very small opening which produces a pressure balance between the narrowed chamber and the atmosphere.

BRIEF DESCRIPTION OF THE DRAWINGS

Above-mentioned and other features and objects of this invention will become more apparent by reference to the following description taken in conjunction with the accompanying drawing, in which:

FIG. 1 is a cross section of one embodiment of a brake force distributor valve assembled in accordance with the principles of the present invention; and FIG. 2 is a cross section of a second embodiment of a brake force distributor valve assembled in accordance with the principles of the present invention.

DESCRIPTION OF THE PREFERRED EMBODIMENTS

The housing of the brake force distributor valve shown in FIG. 1 is formed by a tube 1, both ends of which are turned out to a larger inside diameter extending up to a certain depth, thus providing a radial projection 2 inside the tube. The annular surfaces on each side of projection 2 serve as abutments.

During assembly the valve housing 3 of the pressure-reducing valve, which is designed as a stepped piston, is inserted from one side. Valve housing 3 is movable in an axial direction and sealed against the inner wall of tube 1. The stepped portion of valve housing 3 extends into the reduced diameter part of tube 1 at projection 2 and is also sealed against the wall of the latter. The mentioned stepped portion seats against a supporting or bearing plate 13, the periphery of which is provided with recesses to allow free flow across the plate, the supporting plate in turn being held against the annular abutment 15 of projection 2 by means of springs 14 which bear against the abutment or closure member 16. During assembly closure member 16 is inserted into tube 1 in a telescoping manner under a specific force relative to tube 1 for the purpose of prestressing springs 14 such that the point of response of the pressure-reducing is determined. While this force is still applied the surface of the material of tube 1 is sheared completely through at several places uniformly distributed over its periphery and the sheared material is forced into peripheral groove 51 of member 16 against a sealing ring 52 of rubber-like material as illustrated at 60. In this way, the point of response or changeover of the valve can be exactly determined, since due to the shearing action there is no material flow and, thus, no change of length of tube 1 and the prestress force of springs 14 is maintained. Therefore, a subsequent further adjustment is not necessary.

A high pressure seal is provided between tube 1 and member 16 by shearing the material of tube 1 at a plurality of spaced circumferential points with the sheared material being forced into groove 51. When the sheared material is forced into groove 51, the overall volume of groove 51 will decrease considerably. The rubber-like material of the sealing ring 52 under the sheared material, when the sheared material is forced into groove 51, will migrate and shift toward the space between adjacent shear points such that the material of ring 52 moves out of groove 51 in the space between adjacent spaced sheared points to provide a high pressure sealing contact between tube 1 and member 16.

An annular chamber 5 is formed by the step in the valve housing 3 and by the annular surface 4 of projection 2. An annular abutment flange 6 provided on the outer surface of the stepped portion of valve housing 3 and extending into annular chamber 5 limits the axial movement of valve housing 3 by engaging annular surface 4 of projection 2 during operation. Valve housing 3 provides a continuous longitudinal bore which is double-stepped and receives the valve closure member 8. The edge of a cylindrical member 9 fastened in the valve housing forms the valve seat for the conically shaped closure member 8. An extension of closure member 8 projects through the bore of member 9, the face of said extension being held in abutment against a cross-shaped supporting plate 11 by means of a spring 10 one end of which seats against member 8 while the other end rests against a step in the longitudinal bore 7.

The mentioned cross-shaped supporting plate 11 is fastened by its extensions to the closure member 12 inserted in tube 1. Closure member 12 is also inserted into tube 1 under a specific force during assembly and fastened to tube 1 by the shearing technique described with respect to closure member 16. Again a rubberlike material is employed in the groove of member 12 to provide a desired high pressure seal. Both closure members 12 and 16 provide a central bore or a pressure medium connection 17 and 18, respectively, for the supply of hydraulic pressure medium. The pressure medium line coming from the master cylinder leads to connection 18 whereas connection 17 is connected with the brake line leading to the rear wheel cylinders. By its shape cylindrical member 9 in valve housing 3 ensures a minimum distance between valve housing 3 and closure member 12 which results in an annular chamber 19, said chamber communicating via a lateral bore 20 in insert 9 with a longitudinal bore 7 in valve housing 3. A cross-bore 21 in the stepped portion of valve housing 3 connects longitudinal bore 7 with the annular chamber 22, the latter being formed by a further reduction of the cross-section of the housing between the valve housing and the inner wall of projection 2 in tube 1. Annular chambers 5 and 22 are sealed against each other. Annular chamber 22 is permanently filled with pressure medium whereas annular chamber 5 is filled with air under atmospheric pressure. Since annular chamber 5 changes its volume upon actuation of the system, a possibility for venting has been provided. A sealing element 23 is inserted into a lateral bore in tube 1, said element closing the opening tightly, and the bottom of said element being pierced with a needle to allow for a pressure-balance in annular chamber 5 in case of a vacuum or excess pressure.

The system operates as follows:

The pressure-reducing valve is open in rest position since valve closure member 8 as well as the valve housing 3 together with the face of its cylindrical insert or seat 9 rests against supporting plate 11. At the beginning of the operation the pressure medium is in a pressureless condition throughout the brake line to which the brake force distributor is connected. If the brake system is actuated, the hydraulic pressure continues to flow freely until it reaches the wheel brake cylinders. The pressure medium flows through connection 18 into the chamber 24 with prestressed springs 14 and thence through the recesses at the periphery of supporting plate 13 into annular chamber 22, through cross-bore 21 and longitudinal bore 7 of valve housing 3 and through the open valve, thence through cross-bore 20 into gap 19 located between valve housing 3 and closure member 12, and finally through the opening in supporting plate 11 and connection 17 into the pressure medium line leading to the rear wheel brake cylinders. Pressure is built up in annular chamber 22 then, said pressure being applied to the annular surface of the step and supporting the action of the prestressed springs 14 in order to keep the pressure-reducing valve open. At the same time slot 19 between valve housing 3 and closure member 12 raises and acts against the two aforementioned forces. Due to the larger surface disposed at the face of the valve housing 3, the pressure in slot 19 can finally exceed the total force resulting from the force of prestressed springs 14 and the pressure in annular chamber 22, and valve housing 3 is thus moved against these forces. The pressure medium flow in the pressure-reducing valve is throttled or cut off to the effect that the wheel brake cylinders of those wheels which are running the risk of locking in case of an axle load shift due to deceleration, are separated from the master brake cylinder. Hence, the pressure cannot be raised any higher even if the pedal pressure is increased.

The point of response of the pressure-reducing valve of each brake force distributor is determined during assembly by the force on closure members 12 and 16 which are connected to tube 1 by the shearing operation described above with springs 14 maintaining the desired prestressed force as a result of this shearing operation.

FIG. 2 shows another preferred embodiment of the invention. The valve housing 32 which is designed as a stepped piston, is slidably arranged in axial direction in a bore of the housing 31. A hollow cylindrical member 33 inserted in the bore reduces the cross-section of the bore within the area of the step in the valve housing 32 to a corresponding diameter. Member 33 is secured by means of an annular disc 34 attached to the opening of the bore. The outer surfaces of the steps disposed in valve housing 32 are sealed against the inner wall of the bore in housing 31 and against the inner wall of member 33, respectively.

Valve housing 32 seats against a spring plate 50, said spring plate closing the bore of housing 31 and being held in abutment against housing 31 by means of a spring 35. Spring 35 rests against the bottom of a spring cup 36 which in turn is connected to housing 31 by shearing the surface of the material of cup 36 completely through and forcing the sheared material into peripheral groove 53 of housing 31 against sealing ring 54 of rubber-like material as illustrated at 61. The necessary prestressing of spring 35 is achieved by means of a specific force on the spring cup 36 during assembly. This method of connection is exactly as described above with respect to member 16 and tube 1 except that the material of the abutment member is sheared rather than the material of the housing or tube 1.

The pressure medium connection 38 leads into the annular chamber 37, said chamber being formed by the step in valve housing 32. The cross-bore 39 of valve housing 32 connects annular chamber 37 with the longitudinal bore 40 of the valve housing. Longitudinal bore 40 is stepped. In addition to the valve closure member 41, said bore receives a hexagonal member 42 to throttle the pressure medium flow. By means of a spring resting against hexagonal member 42, valve closure member 41 is held in abutment against the bottom of the housing bore. The valve seat 43 inserted into the valve housing also bears against the bottom of the bore. Thus, a chamber 44 between valve housing 32 and housing 31 is formed which communicates via longitudinal bore 40 and the pressure medium connection 45 with the wheel brake cylinders. The method of operation of this second embodiment corresponds with the embodiment of FIG. 1.

The constructional volume of the brake force distributor valve of the present invention is considerably smaller as compared with constructions heretofore known. The costs of manufacture are lower since spring cup 36 and closure members 16 and 12 are sheared as described hereinabove under a specific load. In this way the point of changeover of the pressure-reducing valve can be exactly determined. Moreover, a lock nut and adjusting means of conventional design which have so far been necessary in the prior art to balance the spring tolerances and manufacturing tolerances, can be eliminated. The screws for mounting the spring cup can also be eliminated. By insertion of a flat sealing ring into the peripheral groove on the housing of FIG. 2 and the closure members of FIG. 1 provided for the shearing operation a high pressure seal can be achieved.

While I have described above the principles of my invention in connection with specific apparatus it is to be clearly understood that this description is made only by way of example and not as a limitation to the scope of my invention as set forth in the objects thereof and in the accompanying claims.

I claim:

1. In assembling a brake force distributor valve including a housing and a prestressed spring having a predetermined force disposed within and coaxial of said housing acting between an abutment member fixed with respect to said housing and an axially movable valve body disposed within and coaxial of said housing, said predetermined force of said spring determining the point of response of said valve body, the method of connecting said housing to said abutment member comprising the steps of:

forming a peripheral groove in one of said housing and said abutment member;

placing a sealing ring of rubber-like material in said peripheral groove;

assembling said housing and said abutment member in a telescoping manner with said spring disposed between said abutment member and said valve body, said one of said housing and said abutment member being disposed within the other of said housing and abutment member;

applying a given axial force to said abutment member relative to said housing to provide said spring with said predetermined force;

shearing the material of said other of said housing and abutment member completely through at selected spaced locations about the periphery thereof corresponding to said peripheral groove before said given axial force is released; and forcing said sheared material adjacent both sides of said peripheral groove equally into said peripheral groove against said sealing ring to provide a high pressure seal between said housing and said abutment just prior to release of said given axial force to connect said housing to said abutment member and to provide an exact location of said abutment member relative to said housing to maintain said predetermined force of said spring after said connection is made and said given axial force is released.

2. The method according to claim 1, wherein said one of said housing and said abutment member is said housing; and
said other of said housing and said abutment member is said abutment member.

3. The method according to claim 1, wherein said one of said housing and said abutment member is said abutment member; and
said other of said housing and said abutment member is said housing.

* * * * *